United States Patent
Hashimoto et al.

(10) Patent No.: US 7,957,422 B2
(45) Date of Patent: Jun. 7, 2011

(54) DEMULTIPLEXER

(75) Inventors: Tsutomu Hashimoto, Osaka (JP);
Tetsuo Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 970 days.

(21) Appl. No.: 11/140,945

(22) Filed: Jun. 1, 2005

(65) Prior Publication Data

US 2006/0056407 A1    Mar. 16, 2006

(30) Foreign Application Priority Data

Sep. 13, 2004  (JP) ................ 2004-265336

(51) Int. Cl.
*H04J 3/24* (2006.01)
(52) U.S. Cl. ..................................... 370/474
(58) Field of Classification Search ............ 370/389, 370/395.64; 375/240.25; 710/317
See application file for complete search history.

(56) References Cited

U.S. PATENT DOCUMENTS

| 5,856,973 | A  | * | 1/1999 | Thompson ................. 370/389 |
| 6,236,432 | B1 |   | 5/2001 | Lee |
| 6,567,409 | B1 | * | 5/2003 | Tozaki et al. ............ 370/395.64 |
| 6,982,993 | B1 | * | 1/2006 | Claveloux et al. .......... 370/503 |
| 7,042,948 | B2 | * | 5/2006 | Kim et al. ............. 375/240.25 |
| 7,089,346 | B2 | * | 8/2006 | Cebulla et al. ............. 710/317 |

FOREIGN PATENT DOCUMENTS

JP       8-79709       3/1996

* cited by examiner

*Primary Examiner* — Jianye Wu
(74) *Attorney, Agent, or Firm* — McDermott Will & Emery LLP

(57) ABSTRACT

In a demultiplexer, if as for a certain packet a packet header detection section has detected a packet header without error, a memory control section controls a payload of the packet which is separated by a payload separation section to be stored in a buffer memory. If, as for a predetermined number of packets, the packet header detection section has detected packet headers without error, the memory control section permits a payload of a packet previous to the predetermined number of packets to be output from the buffer memory.

9 Claims, 4 Drawing Sheets

DEMULTIPLEXER

CROSS-REFERENCE TO RELATED APPLICATION

This application claims priority under 35 U.S.C. §119(a) on Japanese Patent Application No. 2004-265336 filed on Sep. 13, 2004, the entire contents of the specification, drawings and claims of which are hereby incorporated by reference.

BACKGROUND OF THE INVENTION

The present invention relates to a demultiplexer for separating desired data from a multiplexed stream.

In a DVD (Digital Versatile Disk) which is one of the optical disks, compressed/encoded data of video, sound, etc., is recorded. Data read out of the DVD is in the form of an input stream which is formed by a plurality of packets each including a packet header and a payload. Thus, a DVD player requires a demultiplexer for extracting a desired payload from the input stream and supplying the extracted payload to a decoder for decompression.

If a correct payload, i.e., correct data, is not supplied to the decoder, a decoding result of video, sound, or the like, includes disturbances. In the worst case, there is a possibility that the operation of the decoder stops (hangs).

According to a conventional technique disclosed in Japanese Laid-Open Patent Publication No. 8-79709, synchronization recovery of a decoder is realized based on sector synchronization information such that the time required for recovery since occurrence of an error is shortened.

In an optical disk compliant with the DVD standards, every packet header includes a start code without exception, and therefore, the packet header can be detected by a demultiplexer without fail. Further, a payload can be separated without fail based on information included in the packet header, such as payload length information, or the like.

However, in the case where an optical disk incompliant with the DVD standards is placed in a DVD player, there is a possibility that a demultiplexer misdetects a packet header. In this case, a wrong payload is supplied to a decoder. In the worst case, the decoder hangs as described above.

SUMMARY OF THE INVENTION

An objective of the present invention is to provide a demultiplexer capable of consistently outputting correct payloads.

In order to achieve this objective, according to the present invention, a buffer memory is provided for sequentially storing separated payloads, and after confirming that a predetermined number of packet headers are detected without error, a preceding payload is output from the buffer memory.

Specifically, the present invention provides a demultiplexer for extracting effective payloads from an input stream formed by a plurality of packets, each of which includes a packet header and a payload, the demultiplexer comprising: a packet header detection section for sequentially detecting packet headers in the input stream; a payload separation section for sequentially separating payloads included in the input stream based on detection results of the packet header detection section; a buffer memory for sequentially storing the payloads separated by the payload separation section; and a memory control section for performing storage control of the payloads in the buffer memory and output permission control of the payloads from the buffer memory based on detection results of the packet header detection section, wherein if, as for a certain packet, the packet header detection section has detected a packet header without error, the memory control section controls a payload of the packet which is separated by the payload separation section to be stored in the buffer memory, and if, as for a predetermined number of packets, the packet header detection section has detected packet headers without error, the memory control section permits a payload of a packet previous to the predetermined number of packets to be output from the buffer memory.

If, as for a certain packet, there is a possibility that the packet header detection section has misdetected a packet header, the memory control section may perform the output permission control of the buffer memory such that a preceding payload which has a possibility of error is not output from the buffer memory.

DESCRIPTION OF THE PREFERRED EMBODIMENTS

Hereinafter, an embodiment of the present invention is described with reference to the drawings.

Figure 1:
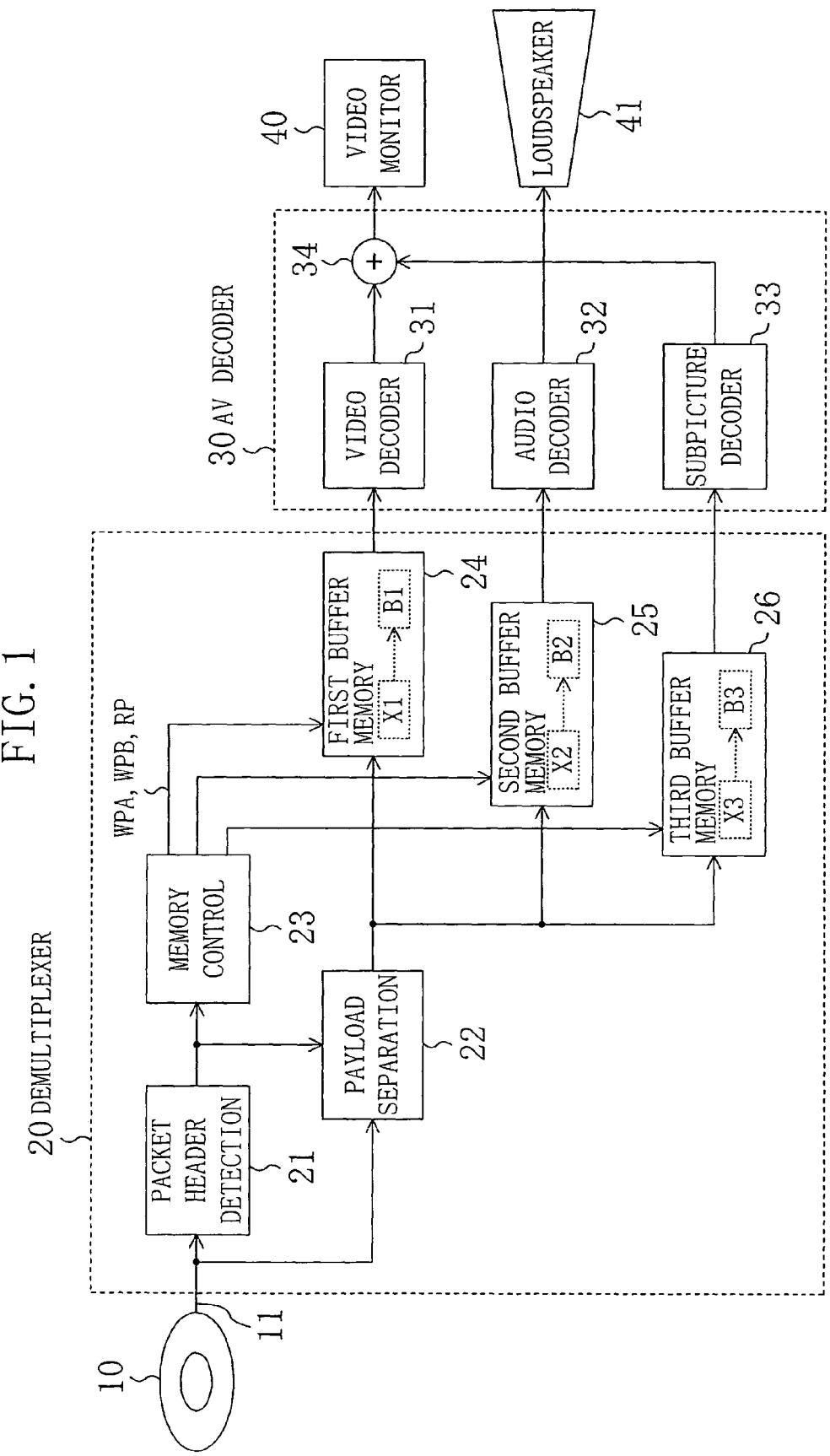
FIG. 1 is a block diagram of a DVD player which uses a demultiplexer according to one embodiment of the present invention.

FIG. 1 shows a DVD player which uses a demultiplexer according to one embodiment of the present invention. The DVD player of FIG. 1 includes a demultiplexer 20 and an AV decoder 30. An optical disk 10 is placed at the input side, and a video monitor 40 and a loudspeaker 41 are connected to the output side. The demultiplexer 20 receives an input stream 11 from the optical disk 10. It should be noted that an optical pickup, a demodulation circuit, an error correction circuit, etc., which are provided between the optical disk 10 and the demultiplexer 20, are omitted from the drawing.

The demultiplexer 20 extracts effective payloads from the input stream 11 formed by a plurality of packets each including a packet header and a payload and supplies the extracted payloads to the AV decoder 30. The demultiplexer 20 includes a packet header detection section 21, a payload separation section 22, a memory control section 23, a first buffer memory 24, a second buffer memory 25 and a third buffer memory 26. Each packet has a payload which includes any of the following compressed/encoded data: primary video data, sound data, and secondary video data (subpicture including subtitle information). The packet header detection section 21 sequentially detects the packet headers included in the input stream 11. The payload separation section 22 sequentially separates the payloads included in the input stream 11 based on detection results of the packet header detection section 21. The first buffer memory 24 sequentially stores primary video payloads separated by the payload separation section 22. The second buffer memory 25 sequentially stores sound payloads separated by the payload separation section 22. The third buffer memory 26 sequentially stores secondary video payloads separated by the payload separation section 22. The first to third buffer memories 24, 25 and 26 each have a ring buffer structure. The memory control section 23 performs storage control and output permission control of the first to third buffer memories 24, 25 and 26. The memory control section 23 has the function of determining the attribute of a payload based on a detection result of the packet header detection section 21 and supplying the output of the payload separation section 22 to any of the first to third buffer memories 24, 25 and 26 according to the attribute of the payload.

The AV decoder 30 decompresses a payload (compressed/encoded data) supplied from the demultiplexer 20 according to the attribute of the payload. The AV decoder 30 includes a video decoder 31, an audio decoder 32, a subpicture decoder 33 and a mixer 34. The video decoder 31 sequentially decodes primary video payloads output from the first buffer memory 24. The audio decoder 32 sequentially decodes sound payloads output from the second buffer memory 25. The subpicture decoder 33 sequentially decodes secondary video payloads output from the third buffer memory 26. The mixer 34 synthesizes a decoding result of the video decoder 31 and a decoding result of the subpicture decoder 33 to supply a signal which represents a result of the synthesis to the video monitor 40. The loudspeaker 41 receives a sound signal from the audio decoder 32.

The first buffer memory 24 functions as both a payload buffer X1 for temporarily storing primary video payloads separated by the payload separation section 22 and a bit buffer B1 which is required by the video decoder 31 under the DVD standards as shown by broken lines in FIG. 1. The memory control section 23 performs storage control of payloads in the first buffer memory 24 using a first write pointer WPA and a second write pointer WPB and performs output permission control of payloads from the first buffer memory 24 using a read pointer RP. Specifically, the video decoder 31 can only read payloads stored in a region between a memory location indicated by the read pointer RP and a memory location indicated by the first write pointer WPA. As well, the second buffer memory 25 functions as both a payload buffer X2 for temporarily storing sound payloads separated by the payload separation section 22 and a bit buffer B2 which is required by the audio decoder 32. The third buffer memory 26 functions as both a payload buffer X3 for temporarily storing secondary video payloads separated by the payload separation section 22 and a bit buffer B3 which is required by the subpicture decoder 33. As for the second buffer memory 25 and the third buffer memory 26, the memory control section 23 also performs the storage control using two write pointers and performs the output permission control using one read pointer.

Figure 2:
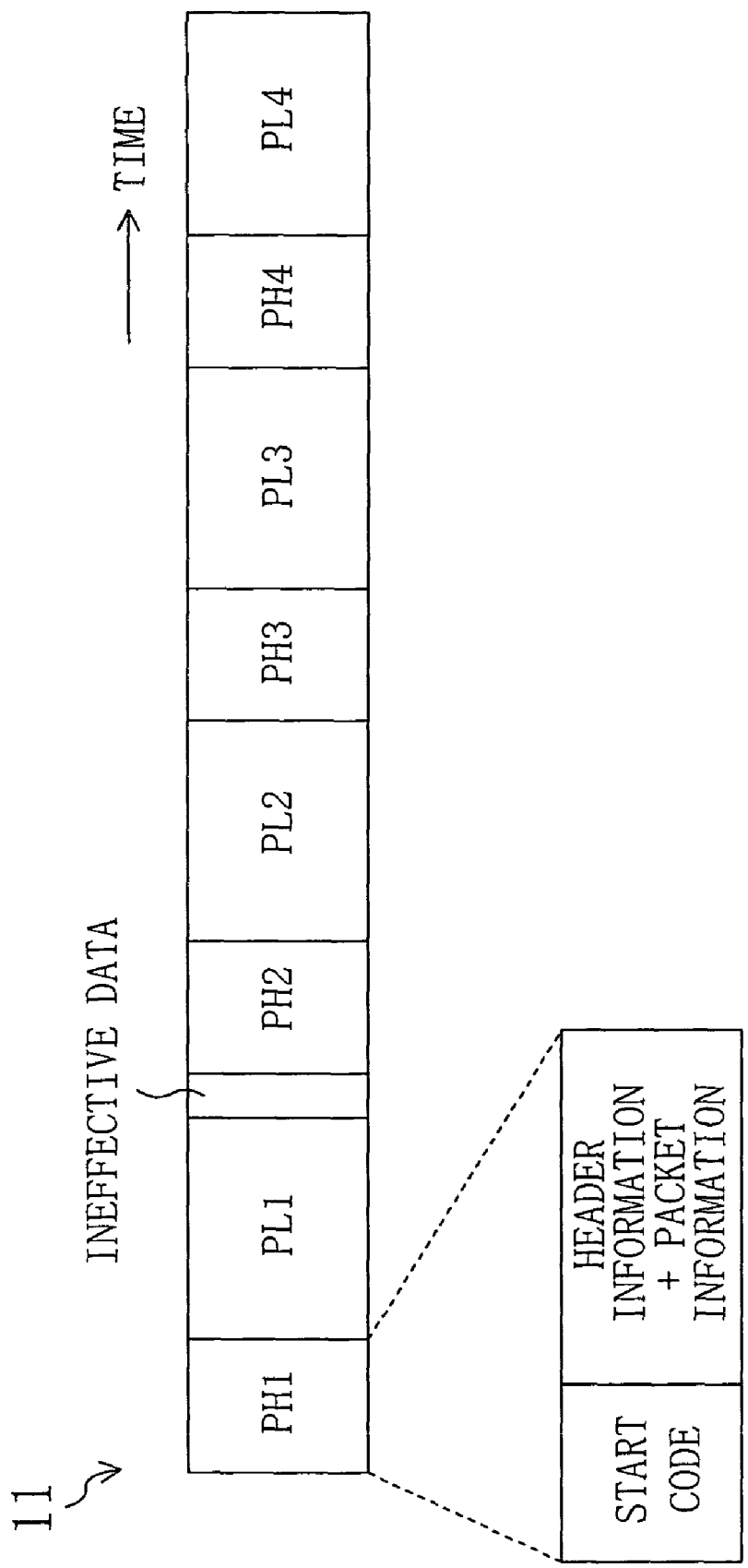
FIG. 2 shows an example of an input stream to the demultiplexer of FIG. 1.

FIG. 2 shows an example of the input stream 11 which is supplied to the demultiplexer 20 of FIG. 1. FIG. 2 shows the first, second, third and fourth packets and ineffective data which exists between the first packet and the second packet. Segment PH1 is a first packet header, segment PL1 is a first payload, segment PH2 is a second packet header, segment PL2 is a second payload, segment PH3 is a third packet header, segment PL3 is a third payload, segment PH4 is a fourth packet header, and segment PL4 is a fourth payload. Each of the first to fourth packet headers PH1 to PH4 is formed by a start code at the leading part of the packet header and a subsequent part which contains header information and packet information. The subsequent part includes information of the payload length. The shown ineffective data is a cause of misdetection of the second packet header PH2.

Next, the storage control and the output permission control of the first buffer memory 24 of FIG. 1 are described in detail with reference to FIG. 3A through FIG. 3D on the assumption that all of the four packets which constitute the input stream 11 shown in FIG. 2 relate to primary video data.

Figure 3A:
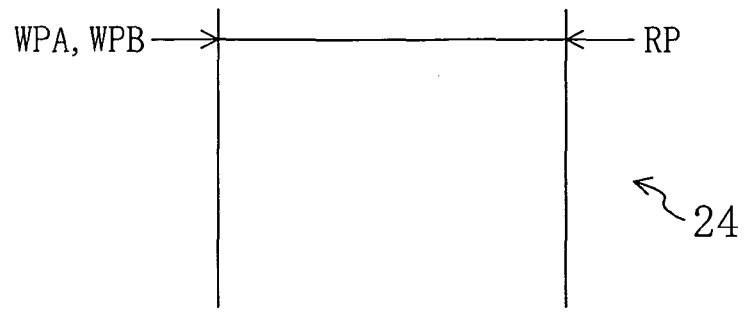
FIG. 3A, FIG. 3B, FIG. 3C and FIG. 3D illustrate storage control and output permission control in a first buffer memory of FIG. 1.

FIG. 3A illustrates the initial state of the first buffer memory 24. In this state, the first buffer memory 24 is vacant, and the first write pointer WPA, the second write pointer WPB and the read pointer RP indicate the same memory location.

The packet header detection section 21 detects the start code included in the first packet header PH1, thereby detecting the first packet header PH1. The payload separation section 22 separates the first payload PL1 based on the detection result of the packet header detection section 21. The memory control section 23 determines whether or not the first packet header PH1 has been detected without error based on the information of payload length which is included in the detected first packet header PH1. Herein, it is assumed that the first packet header PH1 has been detected without error. Therefore, the memory control section 23 controls the first payload PL1 of the packet which has been separated by the payload separation section 22 to be stored in the first buffer memory 24.

Figure 3B:
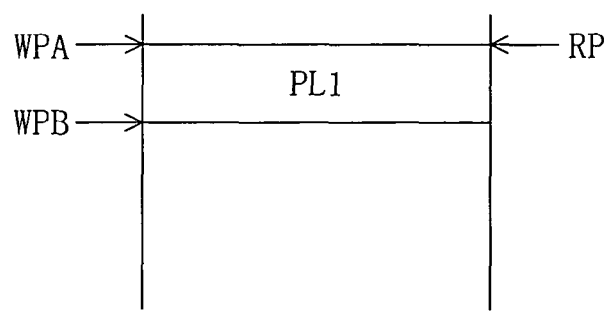

FIG. 3B shows a state where the first payload PL1 is stored in the first buffer memory 24. In this case, the memory control section 23 updates only the second write pointer WPB to indicate the trailing end of the stored first payload PL1 without updating the first write pointer WPA or the read pointer RP. As described above, the video decoder 31 can only read payloads stored in a region between a memory location indicated by the read pointer RP and a memory location indicated by the first write pointer WPA. Thus, in the state of FIG. 3B, reading of the first payload PL1 by the video decoder 31 from the first buffer memory 24 is prohibited.

Next, the packet header detection section 21 detects a start code which is accidentally included in the ineffective data subsequent to the first payload PL1, thereby misdetecting a packet header. The payload separation section 22 erroneously separates a payload based on the wrong detection result of the packet header detection section 21. If such an erroneously-separated payload extends to the middle of the second payload PL2, the second packet header PH2 cannot be detected, and therefore, the second payload PL2 cannot be correctly separated. However, the memory control section 23 determines that a packet header is misdetected by the packet header detection section 21 based on false information of payload length which is included in the misdetected packet header. That is, the payload length represented by this false information is not within a predetermined range, and therefore, it is determined that an error has occurred in the detection of a packet header. The memory control section 23, which has performed the misdetection determination of a packet header as described above, controls a payload erroneously separated by the payload separation section 22 not to be stored in the first buffer memory 24. Specifically, the memory control section 23 does not update any of the first write pointer WPA and the second write pointer WPB.

Next, the packet header detection section 21 detects a start code included in the third packet header PH3, thereby detecting the third packet header PH3 without error. The payload separation section 22 separates the third payload PL3 based on the detection result of the packet header detection section 21. The memory control section 23 determines whether or not the third packet header PH3 has been detected without error based on the information of payload length which is included in the detected third packet header PH3. If the memory control section 23 determines that the third packet header PH3 has been detected without error, the memory control section 23 controls the third payload PL3 separated by the payload separation section 22 to be stored in the first buffer memory 24.

Figure 3C:
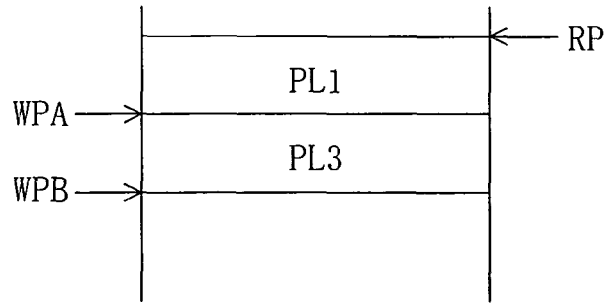

FIG. 3C shows a state where the third payload PL3 is newly stored in the first buffer memory 24. In this state, the memory control section 23 updates the first write pointer WPA to indicate the trailing end of the previously-stored first payload PL1 and the second write pointer WPB to indicate the trailing end of the newly-stored third payload PL3 without updating the read pointer RP. Thus, in the state of FIG. 3C, the video decoder 31 is permitted to read the first payload PL1, i.e., the previous payload, from the first buffer memory 24. However, the video decoder 31 is prohibited to read the newly-stored third payload PL3. It is assumed that, immediately after this, the video decoder 31 reads the first payload PL1 from the first buffer memory 24. In response to this, the memory control section 23 updates the read pointer RP to indicate the trailing end of the first payload PL1 which has already been read.

Next, the packet header detection section 21 detects a start code included in the fourth packet header PH4, thereby detecting the fourth packet header PH4 without error. The payload separation section 22 separates the fourth payload PL4 based on the detection result of the packet header detection section 21. The memory control section 23 determines whether or not the fourth packet header PH4 has been detected without error based on the information of payload length which is included in the detected fourth packet header PH4. If the memory control section 23 determines that the fourth packet header PH4 has been detected without error, the memory control section 23 controls the fourth payload PL4 separated by the payload separation section 22 to be stored in the first buffer memory 24.

Figure 3D:
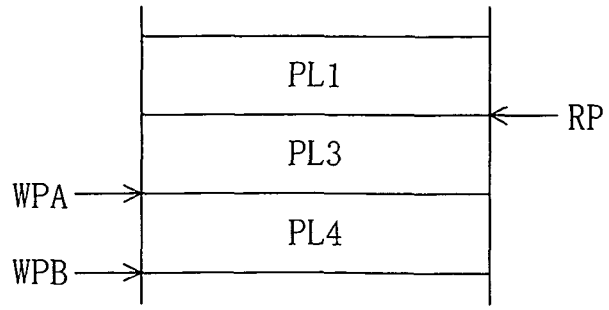

FIG. 3D shows a state where the fourth payload PL4 is newly stored in the first buffer memory 24. In this state, the memory control section 23 updates the first write pointer WPA to indicate the trailing end of the previously-stored third payload PL3 and the second write pointer WPB to indicate the trailing end of the newly-stored fourth payload PL4 without updating the read pointer RP. Thus, in the state of FIG. 3D, the video decoder 31 is permitted to read the third payload PL3 from the first buffer memory 24. However, the video decoder 31 is prohibited to read the newly-stored fourth payload PL4.

As described above, in the demultiplexer 20 shown in FIG. 1, a payload is output from the first buffer memory 24 after confirming that a succeeding packet header has been detected without error. Thus, primary video payloads which are supplied from the demultiplexer 20 to the video decoder 31 are always correct. This also applies to the supply of sound payloads to the audio decoder 32 and the supply of secondary video payloads to the subpicture decoder 33.

In the above example, the memory control section 23 determines, as for a certain packet, whether or not the packet header detection section 21 has detected a packet header without error based on the information of payload length which is included in the detected packet header. However, a start code or information which exists at the leading end of a payload may be examined, and the memory control section 23 may carry out the determination based on a result of the examination.

When also considering the possibility that, in the example of FIG. 2, the ineffective data existing between the first packet and the second packet has been caused because of misdetection of the first packet header PH1, it is better not to output the first payload PL1. That is, if a certain packet has a possibility of misdetection of a packet header, the memory control section 23 may perform the output permission control of the first buffer memory 24 such that a preceding payload which has a possibility of error (first payload PL1 in the above example) is not output from the first buffer memory 24. For example, in the state of FIG. 3B, the first write pointer WPA and the read pointer RP are updated to indicate the trailing end of the first payload PL1 which has a possibility of error. As a result, as in the initial state shown in FIG. 3A, the first write pointer WPA, the second write pointer WPB and the read pointer RP indicate the same memory location. Thus, the video decoder 31 does not read the first payload PL1 from the first buffer memory 24.

Figure 4:
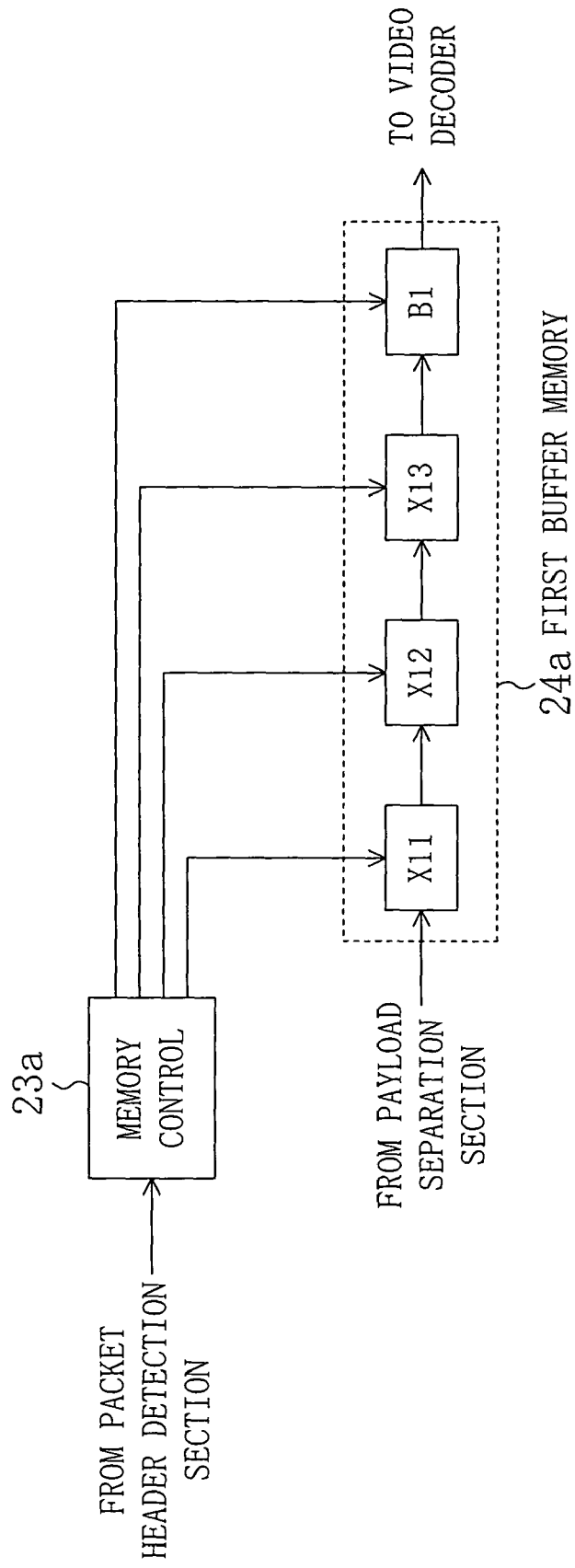
FIG. 4 is a block diagram showing a variation of a structure of the first buffer memory of FIG. 1.

FIG. 4 shows a variation of the structure of the first buffer memory 24 of FIG. 1. In this variation, an output permission for a preceding payload is issued after confirming that a plurality of packet headers have been detected without error, whereby the reliability of the demultiplexer is improved. A first buffer memory 24a shown in FIG. 4 includes three memories X11, X12 and X13 and a bit buffer B1. The three memories X11, X12 and X13 are cascaded to constitute a multistage payload buffer, and the output of the multistage payload buffer is connected to the bit buffer B1. A memory control section 23a shown in FIG. 4 performs storage control and output permission control for the memories X11, X12 and X13 which constitute the multistage payload buffer and administers storage control of the bit buffer B1.

It should be noted that even when, in the structure of FIG. 1, the memory control section 23 performs the storage control of payloads in the first buffer memory 24 using three or more write pointers, effects equivalent to those obtained in the example of FIG. 4 are also obtained.

As described above, a demultiplexer of the present invention has such an advantage that payloads supplied to a decoder are always correct and is therefore useful for optical disk players, magnetic disk players, and the like. Further, the present invention is also applicable to systems which use multiplexed streams, such as digital broadcasting, internet communications, etc.

What is claimed is:

1. A demultiplexer for extracting effective payloads from an input stream formed by a plurality of packets including a first packet and a plurality of subsequent packets subsequent to the first packet, the first packet including a packet header and a payload, and each of the subsequent packets including a packet header and a payload, the demultiplexer comprising:

a packet header detection section for sequentially detecting packet headers of the plurality of packets in the input stream;

a payload separation section for sequentially separating payloads included in the plurality of packets based on detection results of the packet header detection section;

a buffer memory for sequentially storing the payloads separated by the payload separation section; and a memory control section for performing storage control of the payloads in the buffer memory and output permission control of the payloads from the buffer memory based on detection results of the packet header detection section, wherein:

when the packet header detection section has detected the packet header of the first packet without error, the memory control section controls the payload of the first packet which is separated by the payload separation section to be stored in the buffer memory, and the memory control section controls the payload of the first packet stored in the buffer memory not to be output from the buffer memory until the packet header detection section determines that at least one of packet headers of the subsequent packets has been detected without error, and allows the payload of the first packet stored in the buffer memory to be output from the buffer memory when the packet header detection section determines that at least one of packet headers of the subsequent packets has been detected without error, and when the memory control section determines that the packet header detection section has misdetected the packet header of the first packet, the memory control section controls the payload of the first packet which is erroneously separated by the payload separation section not to be stored in the buffer memory.

2. The demultiplexer of claim 1, wherein when there is a possibility that the packet header detection section has misdetected the packet header of the first packet, the memory control section controls the payload of the first packet which has a possibility of error not to be output from the buffer memory.

3. The demultiplexer of claim 1, wherein the memory control section determines whether or not the packet header detection section has detected a packet header without error based on payload length information included in the detected packet header.

4. The demultiplexer of claim 1, wherein:

the buffer memory has a plurality of buffers each for storing a payload separated by the payload separation section, and the memory control section has a function of determining an attribute of a payload based on a detection result of the packet header detection section and assigning an output of the payload separation section to any of the plurality of buffers according to the attribute of the payload.

5. The demultiplexer of claim 1, wherein the buffer memory also functions as a bit buffer which is required by a decoder for processing a payload output from the demultiplexer.

6. The demultiplexer of claim 5, wherein the memory control section performs storage control of payloads in the buffer memory using a plurality of write pointers and performs output permission control of payloads from the buffer memory using one read pointer.

7. The demultiplexer of claim 1, wherein the buffer memory is formed by cascading a plurality of memories each for storing a payload.

8. The demultiplexer of claim 1, wherein the packet header detection section receives a packet which has a payload including compressed/encoded video or sound data.

9. The demultiplexer of claim 1, wherein the memory control section controls the payload of the first packet stored in the buffer memory not to be output from the buffer memory until the packet header detection section determines that plural packet headers of the subsequent packets have been detected without error, and allows the payload of the first packet stored in the buffer memory to be output from the buffer memory when the packet header detection section determines that the plural packet headers of the subsequent packets have been detected without error.

* * * * *